United States Patent
Li et al.

(10) Patent No.: US 9,949,246 B2
(45) Date of Patent: Apr. 17, 2018

(54) DEVICE TO DEVICE (D2D) CONTROL INFORMATION RELAY

(71) Applicant: Telefonaktiebolaget LM Ericsson (publ), Stockholm (SE)

(72) Inventors: Yunxi Li, Järfälla (SE); Fredrik Gunnarsson, Linköping (SE); Stefano Sorrentino, Solna (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 14/409,172

(22) PCT Filed: Sep. 24, 2014

(86) PCT No.: PCT/SE2014/051092
§ 371 (c)(1),
(2) Date: Dec. 18, 2014

(87) PCT Pub. No.: WO2015/047167
PCT Pub. Date: Apr. 2, 2015

(65) Prior Publication Data
US 2016/0227518 A1    Aug. 4, 2016

Related U.S. Application Data

(60) Provisional application No. 61/883,215, filed on Sep. 27, 2013.

(51) Int. Cl.
H04W 72/04 (2009.01)
H04W 76/02 (2009.01)
(Continued)

(52) U.S. Cl.
CPC ....... *H04W 72/042* (2013.01); *H04W 76/023* (2013.01); *H04B 7/2606* (2013.01);
(Continued)

(58) Field of Classification Search
CPC .... H04L 1/0003; H04L 1/0009; H04L 1/1867
See application file for complete search history.

(56) References Cited

U.S. PATENT DOCUMENTS 8,107,883 B2   1/2012  Peng et al.
2009/0097433 A1*  4/2009  Shen ............... H04B 7/155
370/315
(Continued)

FOREIGN PATENT DOCUMENTS

RU    2011142449       4/2013
WO   WO 2010/059856 A1   5/2010
(Continued)

OTHER PUBLICATIONS

International Search Report, International Application No. PCT/SE2014/051092 dated Jan. 30, 2015, 5 pages.
(Continued)

*Primary Examiner* — Yemane Mesfin
*Assistant Examiner* — Henry Baron
(74) *Attorney, Agent, or Firm* — Sage Patent Group

(57) ABSTRACT

A method for a network node, a method for a relay wireless device, a method for an out of coverage wireless device, a network node, and a relay wireless device, an out of coverage wireless device are presented. The network node serves a cell in which a relay wireless device is at least partially located, the network node provides at least partial network coverage for the relay wireless device located in the cell, and an out of coverage wireless device is at least partially out of network coverage from the network node. The method includes determining that the network node should control the out of coverage wireless device. The method further includes determining D2D control information to be used for controlling the out of coverage wireless
(Continued)

device, and transmitting the D2D control information to the out of coverage wireless device via a relay wireless device.

30 Claims, 10 Drawing Sheets

(51) Int. Cl.
| | | |
|---|---|---|
| H04W 52/04 | (2009.01) | |
| H04W 88/04 | (2009.01) | |
| H04W 52/38 | (2009.01) | |
| H04W 56/00 | (2009.01) | |
| H04B 7/26 | (2006.01) | |

(52) U.S. Cl.
CPC .......... *H04W 52/04* (2013.01); *H04W 52/383* (2013.01); *H04W 56/0025* (2013.01); *H04W 88/04* (2013.01)

(56) References Cited

U.S. PATENT DOCUMENTS

| | | | |
|---|---|---|---|
| 2010/0279672 A1* | 11/2010 | Koskela | H04W 36/30 455/418 |
| 2012/0163252 A1* | 6/2012 | Ahn | H04L 1/0003 370/280 |
| 2013/0121296 A1 | 5/2013 | Jung et al. | |
| 2013/0225166 A1* | 8/2013 | Akhtar | H04W 24/02 455/435.1 |
| 2014/0302784 A1* | 10/2014 | Kim | H04W 8/005 455/41.2 |

FOREIGN PATENT DOCUMENTS

| | | |
|---|---|---|
| WO | WO 2010/082084 A1 | 7/2010 |
| WO | WO 2010/109303 | 9/2010 |
| WO | WO 2011/071688 | 6/2011 |
| WO | WO 2014/178671 A1 | 11/2014 |

OTHER PUBLICATIONS

Written Opinion of the International Searching Authority, International Application No. PCT/SE2014/051092 dated Jan. 30, 2015, 10 pages.
Ericsson: "Synchronization Procedures for D2D Discovery and Communication" 3GPP Draft; R1-134720 D2D Synchronization Procedures, $3^{RD}$ Generation Partnership Project (3GPP), Mobile Competence Centre; 650 Route Des Lucioles; F-06921 Sophia-Antipolis Cedex; France; vol. RAN WG1, no. Guangzhou, China; Sep. 27, 2013, 6 pages; Retrieved from the Internet: URL:http://ww.3gpp.org/ftp/tsg_ran/WG1_RL1/TSGR1_74b/Docs/.
Nokia et al: "D2D Communication" 3GPP Draft; R1-132318, $3^{RD}$ Generation Partnership Project (3GPP), Mobile Competence Centre; 650 Route Des Lucioles; F-06921 Sophia-Antipolis Cedex; France; vol. RAN WG1, no. Fukuoka, Japan; May 11, 2013, 6 pages; Retrieved from the Internet: URL:http://ww.3gpp.org/ftp/tsg_ran/WG1_RL1/TSGR1_73/Docs/.
Korean Office Action, Corresponding PCT Application No. PCT/SE2014/051092 dated Feb. 20, 2017, 9 pages with 4 pages of translation.

\* cited by examiner

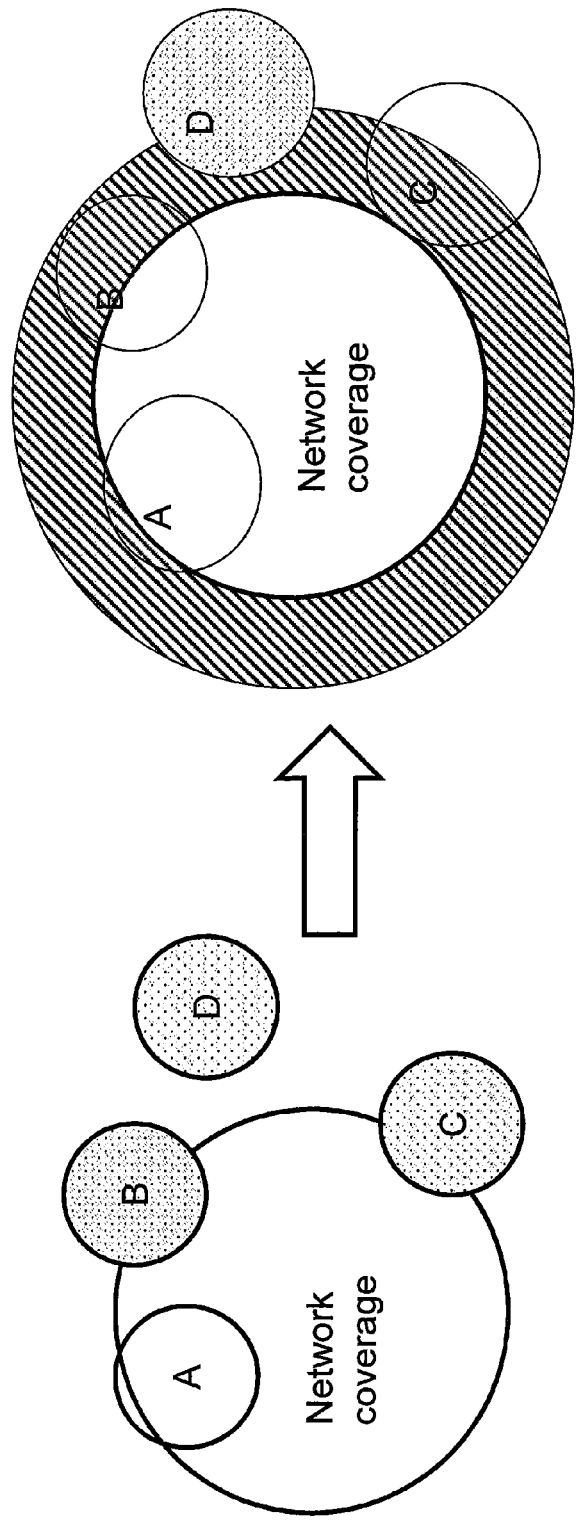
Fig. 4 No D2D control information relay
Fig.5 With D2D control information relay

DEVICE TO DEVICE (D2D) CONTROL INFORMATION RELAY

CROSS REFERENCE TO RELATED APPLICATION

This application is a 35 U.S.C. § 371 national stage application of PCT International Application No. PCT/SE2014/051092, filed in the English language on 24 Sep. 2014, which itself claims the benefit of U.S. Provisional Patent Application No. 61/883,215, filed 27 Sep. 2013, the disclosures and contents of both of which are incorporated by reference herein in their entirety.

TECHNICAL FIELD

Embodiments herein relate generally to a network node, a method in the network node, a relay wireless device, a method in the relay wireless device, an out of coverage wireless device and a method in the out of coverage wireless device. More particularly the embodiments herein relate to handling relay of D2D control information using D2D communication.

BACKGROUND

Device to Device (D2D) is a well-known and widely used component of many existing wireless technologies when it comes to direct communication between wireless devices. D2D communications as an underlay to cellular networks have been proposed as a means to take advantage of the proximity of communicating devices and at the same time to allow devices to operate in a controlled interference environment. Typically, it is suggested that such D2D communication shares the same spectrum as the cellular system, for example by reserving some of the cellular uplink resources for D2D purposes. Allocating dedicated spectrum for D2D purposes is another alternative. For D2D communication to occur, the involved wireless device must have the same understanding of uplink subframe timing as the cellular network as they otherwise might overlap in time with cellular transmissions. Proximity Service (ProSe) should support D2D operations for wireless devices which are out of coverage from the network. In such a case where ProSe supports D2D communication for wireless devices which are out of coverage from the network, different synchronization options are possible: The out of coverage wireless devices may synchronize to a global reference (e.g., a GPS), which is in general different from the synchronization reference of deployed networks. Another possibility is that the out of coverage wireless device may operate in a fully asynchronous fashion (no synchronization reference, at least for discovery).

A wireless device which is ProSe enabled is required to work (discover and communicate with other ProSe enabled wireless devices) without network coverage.

However, the ProSe enabled wireless device is unable to achieve synchronization with the cellular system. A wireless device which is out of coverage from the cellular system will work in asynchronous mode, i.e. the wireless device transmits randomly in time and possibly with an offset in the frequency, which will cause severe interference to other wireless devices in its proximity and within the cellular network coverage, especially but not exclusively for a Time Division Duplex (TDD) system.

Furthermore, the wireless device has to use the resources that are preconfigured in the wireless device. The preconfigured resources are limited and lack flexibility (since they are pre-configured). This may lead to the high possibility of congestion when many wireless devices in proximity want to communicate simultaneously. Furthermore, wireless devices that are out of coverage have to use the power information preconfigured in the wireless device. The preconfigured power information cannot be adjusted according to the live/real network environment since they are out of coverage. In some cases, e.g. where there are several small cells deployed in dense, the preconfigured power might be too high to cause severe interference to the wireless devices within coverage. In other cases, e.g. where the wireless devices are scattered in a rather large area (e.g. 10 s meters), the preconfigured power might be too low to be heard by other wireless devices.

SUMMARY

It is an object in this disclosure to basically address the problems outlined above. These objects and others may be obtained by providing the methods, network nodes and the devices according to the independent claims attached below.

According to a one aspect, a method in a network node is provided. The method in the network node handles relay of D2D control information using D2D communication. The network node serves a cell in which a relay wireless device is at least partially located, and where further the network node provides at least partial network coverage for the relay wireless device located in the cell, and where furthermore an out of coverage wireless device is at least partially out of network coverage from the network node. The method includes determining that the network node should control the out of coverage wireless device. The method further includes determining D2D control information to be used for controlling the out of coverage wireless device (305), and furthermore the method includes transmitting the D2D control information to the out of coverage wireless device via a relay wireless device.

According to another aspect, a method in a relay wireless device is provided. The method in the relay wireless device handles relay of D2D control information using D2D communication. The relay wireless device is located in a cell served by a network node. Further the relay wireless device is at least partially provided with network coverage by a network node, and an out of coverage wireless device (305) is at least partially out of network coverage from the network node. The method includes receiving the D2D control information from the network node. The method further includes relaying the D2D control information to the out of coverage wireless device using D2D communication.

According to another aspect, a method in an out of coverage wireless device is provided. The method in an out of coverage wireless device handles relay of D2D control information using D2D communication. The out of coverage wireless device is at least partially out of network coverage from a network node serving a cell. The out of coverage wireless device is further adapted to communicate with a relay wireless device, where the relay wireless device is located in a cell served by the network node. The relay wireless device is at least partially provided with network coverage by the network node. The method includes receiving the D2D control information from the network node and relayed through the relay wireless device. The method further includes applying the received D2D control information so that the out of coverage wireless device is controlled by the network node.

According to another aspect, a network node for handling relay of D2D control information using D2D communication is provided. The network node includes a processor, and a memory. The memory is coupled to the processor and includes a computer readable program code embodied in the memory that when executed by the processor causes the network node to perform operations. The operations include determining that the network node should control an out of coverage wireless device. The operations further include determining D2D control information to be used for controlling the out of coverage wireless device and furthermore the operations include transmitting the D2D control information to the out of coverage wireless device via a relay wireless device (303).

According to another aspect, a relay wireless device for handling relay of D2D control information using D2D communication is provided. The relay wireless device includes a processor, and a memory. The memory is coupled to the processor and includes a computer readable program code embodied in the memory that when executed by the processor causes the network node to perform operations. The operations include receiving the D2D control information from the network node, and relaying the D2D control information to the out of coverage wireless device using D2D communication.

According to another aspect, a out of coverage wireless device for handling relay of D2D control information using D2D communication is provided. The out of coverage wireless device includes a processor, and a memory. The memory is coupled to the processor and includes a computer readable program code embodied in the memory that when executed by the processor causes the network node to perform operations. The operations include receiving the D2D control information from the network node and relayed through a relay wireless device and applying the received D2D control information so that the out of coverage wireless device is controlled by the network node.

In some embodiments, the synchronization procedure conveys information about:
D2D resource pool to be used for transmission.
D2D resource pool to be used for reception.
Useful information regarding the synchronization source identity and reliability.

In some embodiments, the network node broadcast the synchronization reference and the D2D resource pool for transmission and reception within the cell/cluster In some embodiments, ProSe enabled wireless device that are camping on a cell/cluster relay the synchronization reference and corresponding D2D resource pool to be used for reception.

An advantage that may be achieved when using above solution is that the relay wireless devices having network coverage is able to relay the D2D control plane information to the wireless devices which are out of coverage, therefore the network node is able to control the behavior of the out of coverage wireless device in a more resource economical manner. Even though the out of coverage wireless networks they may still be controlled by the network such that they can to some extent adapt its behavior according to the live/real network environment through the relayed control information.

The wireless devices which are out of coverage have received relayed D2D control information. This will form an isolation strip, which provides the advantage of preventing the relay wireless device having network coverage from being interfered by the wireless device which is out of coverage.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 4 is a schematic block diagram illustrating embodiments of no D2D control information relay.

FIG. 5 is a schematic block diagram illustrating embodiments of D2D control information relay.

The drawings are not necessarily to scale and the dimensions of certain features may have been exaggerated for the sake of clarity. Emphasis is instead placed upon illustrating the principle of the embodiments herein.

DETAILED DESCRIPTION

In a typical communications network, a wireless device communicates via a Radio Access Network (RAN) to one or more Core Networks (CNs). The communications network may also be referred to as e.g. a wireless communications network, a wireless communications system, a communications network, a communications system, a network or a system.

Figure 1:
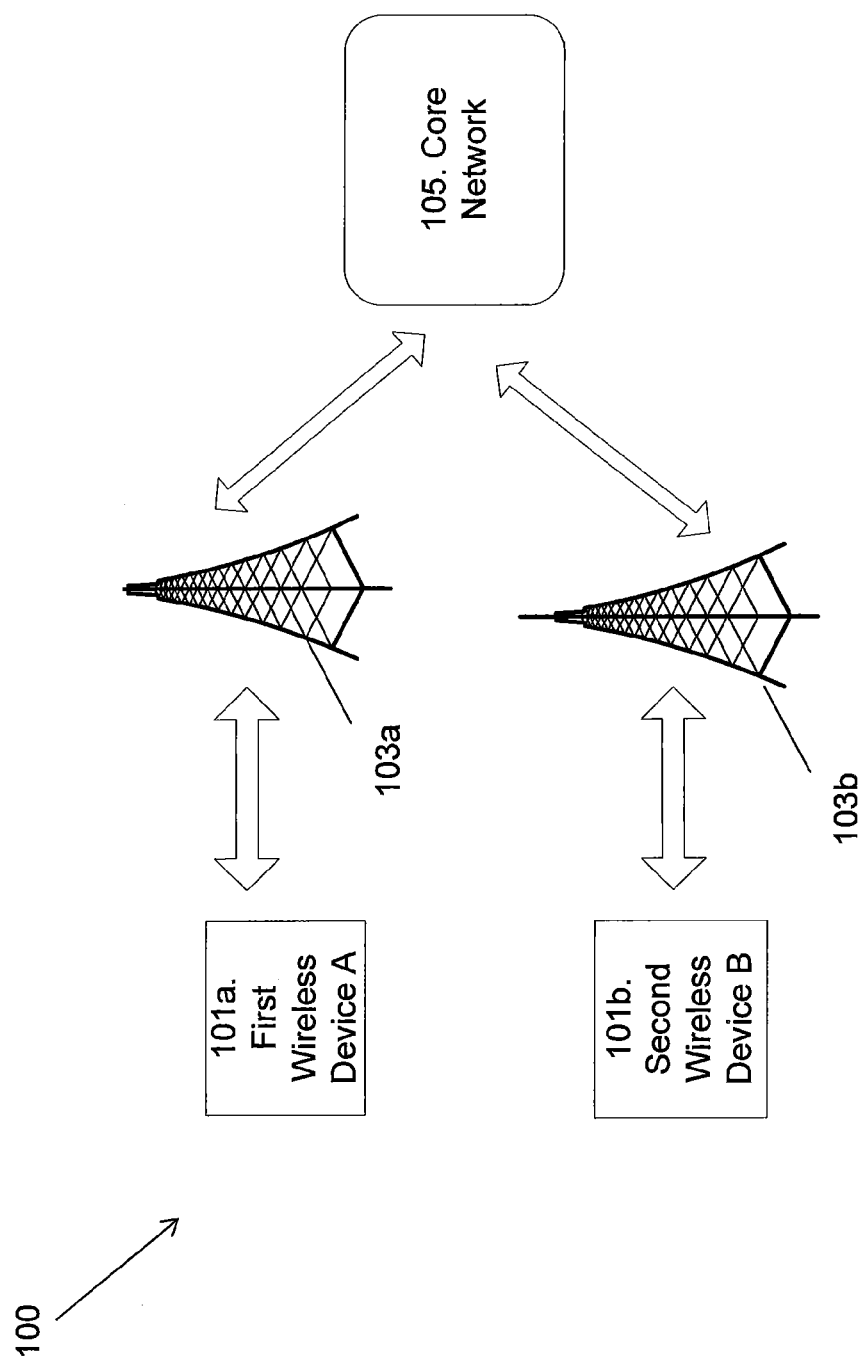
FIG. 1 is a schematic block diagram illustrating a communications system without implementing ProSe.

In wireless technologies, when two wireless devices in close proximity communicate with each other, their data path (user plane) goes via a operator's network. Such typical data path for this type of communication is exemplified in FIG. 1. In FIG. 1, a communications system 100 comprises a first wireless device A 101a which communicates with a second wireless device B 101b via their respective base station, i.e. a first base station 103a and a second base station 103b. Nodes comprised in the core network 105 are also involved in the communication between the two wireless devices 101.

The wireless device may be a device by which a subscriber may access services offered by an operator's network and services outside operator's network to which the operator's radio access network and core network provide access, e.g. access to the Internet. The wireless device may be any device, mobile or stationary, enabled to communicate over a radio channel in the communications network, for instance but not limited to e.g. user equipment (UE), mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the radio access network, with another entity, such as another wireless device or a server.

The communications system covers a geographical area which is divided into cell areas. Each cell area is served by a base station. The base station sometimes may be referred to as e.g. Radio Base Station (RBS), evolved Node B (eNB), eNodeB, NodeB, B node, or Base Transceiver Station (BTS), depending on the technology and terminology used.

When wireless devices are in proximity to each other, they may be able to use a "direct mode" or "locally-routed" path instead of communicating via the operator network. Such direct communication may be referred to as Proximity Service (ProSe). ProSe may be applicable in both commercial/social use and in public safety in for example the case of lack of Evolved Universal Terrestrial Radio Access Network (EUTRAN) coverage and also in the case when EUTRAN coverage is available.

Figure 2:
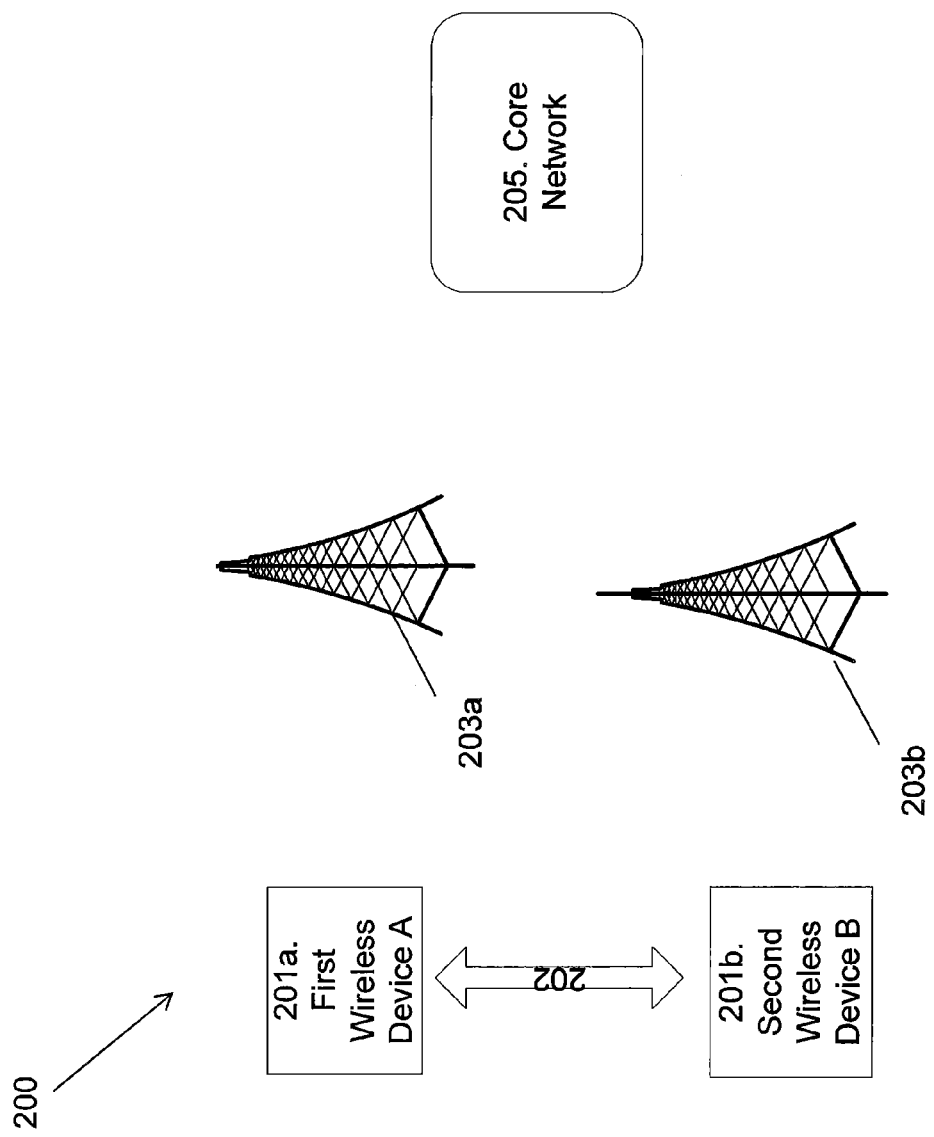
FIG. 2 is a schematic block diagram illustrating a communications system implementing ProSe.

An example of a ProSe communications system 200 is exemplified in FIG. 2 where the wireless device A 201a and the wireless device B 201b communicates using a ProSe direct link 202, without going via the first base station 203a and the second base station 203b and the nodes in the core network 205. In some embodiments, the communication between the first wireless device A 201a and the second wireless device B 201b may be locally routed via the first base station 203a in the case that both wireless devices 203a, 203b are served by the first base station 203a.

Figure 3:
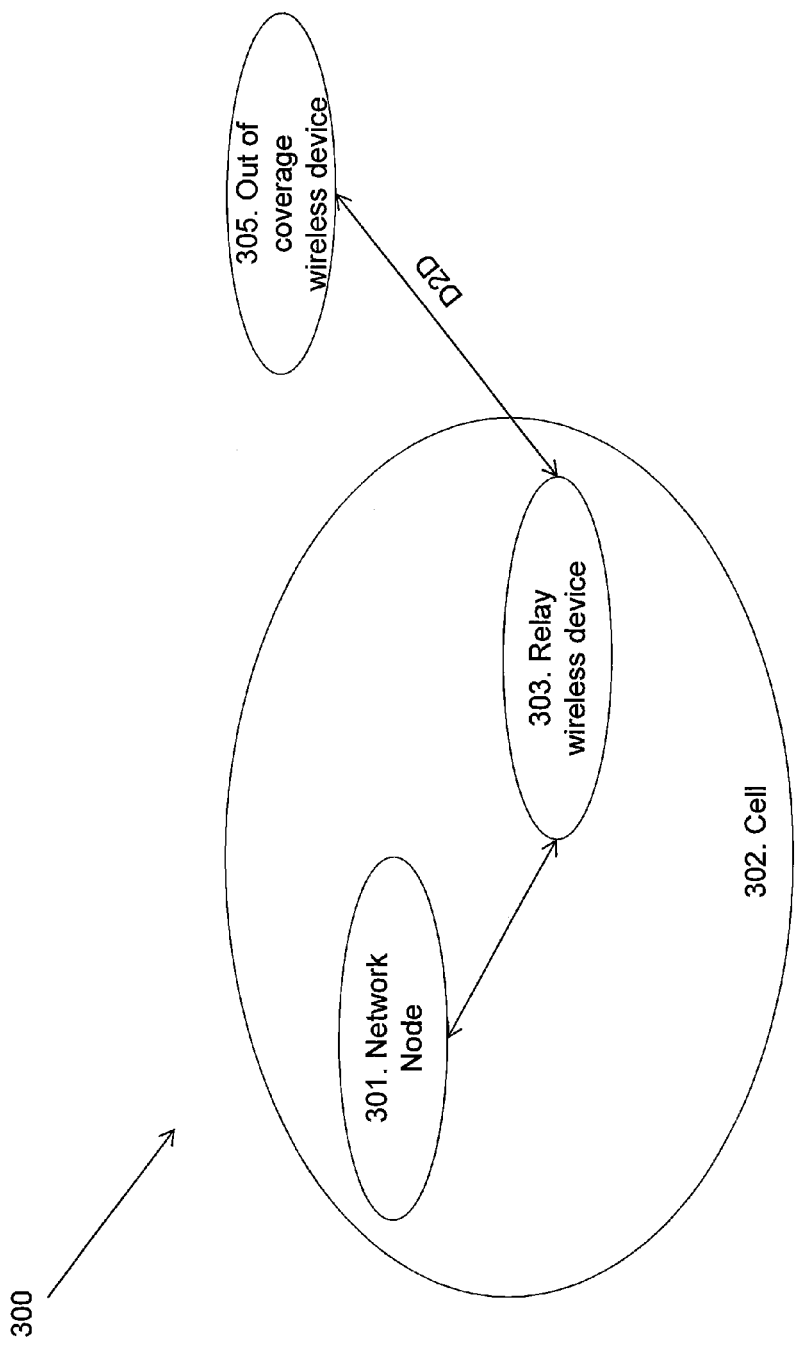
FIG. 3 is a schematic block diagram illustrating embodiments of a communications system.

FIG. 3 depicts a communications system 300 in which embodiments herein may be implemented. The communications system 300 may in some embodiments apply to one or more radio access technologies such as for example Long Term Evolution (LTE), LTE Advanced, Wideband Code Division Multiple Access (WCDMA), Global System for Mobile Communications (GSM), or any other radio access technology, or other radio access technologies such as e.g. Wireless Local Area Network (WLAN).

The communications system 300 comprises a network node 301 and serving a cell 302. The network node 301 may be a base station such as a NodeB, an evolved NodeB (eNB), RBS, BTS, or a Radio Network Controller (RNC), a Cluster Head (CH) any other network unit capable to communicate over a radio carrier with a wireless device being present in the cell 302. In some embodiments, the network node 301 is even a wireless device.

The wireless device being present in the cell 302 as seen in FIG. 3 is referred to as a relay wireless device 303. The relay wireless device 303 is a wireless device having capabilities to relay information to other entities in the communications system 300. The relay wireless device 303 is also capable of communicating with the network node 301 over a radio carrier and is also referred to as being at least partly within coverage of the network node 301 or referred to as having at least partly network coverage. The relay wireless device 303 is further capable of communicating with other wireless devices in the communications system 300, both which are in coverage of the network node 301 or which are not in coverage of the network node 301. In FIG. 3, the relay wireless device 303 is seen as being capable of communicating with an out of coverage wireless device 305 using D2D communication. The out of coverage wireless device 305 is a wireless device which is at least partly out of coverage from the network node 301, i.e. it has at least partly no network coverage.

The term network coverage means that coverage is provided by the network node 301. A wireless device having network coverage may also be described as being within the radio range of the network node 301, to have radio coverage, to have cellular coverage from the cellular network provided by the network node etc.

The relay wireless device 303 and the out of coverage wireless device 305 may also be referred to as first and second wireless devices. Both the relay wireless device 303 and the out of coverage wireless device 305 are ProSe enabled.

FIG. 3 shows only one network node 301, only one relay wireless device 303 and only one out of coverage wireless device 305. However, the communications system 300 may comprise any other suitable number of network nodes, relay wireless devices and out of coverage wireless devices.

It should be noted that the communication links between the entities of the communications system 300 may be of any suitable kind including either a wired or wireless link. The links may use any suitable protocol depending on type and level of layer (e.g. as indicated by the OSI model) as understood by the person skilled in the art.

To solve the issue regarding the synchronization of out of coverage wireless devices with the network node and that the out of coverage wireless device needs to use the pre-configured resources and power, the following is proposed: The relay wireless device 303 within coverage will relay/propagate the control information, also referred to as D2D control information, received from network node 301 (to the out of coverage wireless device 305) to provide network control to the cellular network and to prevent the wireless devices coverage (both the relay wireless device 303 and any other wireless devices in coverage of the network node 301 not shown in FIG. 3) from the interference caused by the out of coverage wireless device 305. Possibly, the relay wireless device 303 under network coverage may signal, to the network node 301, information received from the out of coverage wireless device 305. Such information may be useful for the network node 301 in order to adjust e.g. resource allocation and power control based on the traffic load and amount of in-coverage and out of coverage wireless devices.

Before continuing with the description of the method for handling relay of control information using D2D communication, a few terms which are used in the following description will be clarified.

D2D control information: the control plane data that will be relayed to wireless devices which are out of coverage.

D2D relay configuration information: information which controls the behavior of the relay wireless device. It will not be relayed to out of coverage wireless device.

D2D activity status information: information that will be relayed to the network node to provide information about wireless device(s) which are under control by the network node so that the network node can adapt its resources accordingly.

The above three types of information will be described in more detail later.

FIG. 4 illustrates a scenario without any D2D control information relay. The circles denoted A, B, C and D in FIG. 4 represents D2D wireless devices radio range, i.e. the area where the D2D radio signals transmitted from A,B,C and D can be detected. The large circle denoted network coverage is the cellular system coverage. The large circle in FIG. 4 is the same as the cell 302 in FIG. 3. Wireless device A is in coverage and does not provide any interference to other cellular wireless devices. The dotted circles representing wireless devices B, C and D in FIG. 4 are out of network coverage. The wireless devices located in the overlapped area between B and the cellular network and between C and the cellular network will suffer from severe interference from wireless devices B and C.

FIG. 5 illustrates a scenario with D2D control information relay. With D2D control information relay, the wireless device in the "relayed area" (the hatched circle surrounding the network coverage) may synchronize with the cellular network. The wireless devices B and C will not cause interference to the cellular network. The wireless device D which is outside "relayed area", represented by a dotted circle, is un-synchronized with the cellular network but will not cause any interference to cellular system due to a "relayed area" isolating effect.

The method for enabling control of an out of coverage wireless device 305 using D2D communication, according to some embodiments will now be described with reference to the signaling diagram depicted in FIG. 6. The method comprises the following steps, which steps may as well be carried out in another suitable order than described below.

Step 601

The network node 301 determines that it should control the out of coverage wireless device 305. In some embodiments, it is configured by OaM.

Step 602

In some embodiments, the relay wireless device 303 becomes configured to relay D2D control information. The configuration of the relay wireless device 303 may be performed in different ways. Some of the different ways of configuring the relay wireless device 303 is described below in steps 602a-602c, however there are other ways of configuring the relay wireless device 303 which will be described in more detail later.

Step 602a

This step is a substep of step 602 which describes an embodiment for configuring the relay wireless device 303 to be able to relay D2D control information, i.e. to behave as a relay. In some embodiments, the network node 301 transmits D2D relay configuration information to the relay wireless device 303. The D2D relay configuration information may be comprised in cellular broadcast information, i.e. Master Information Block (MIB) or System Information Block (SIB) and be periodically broadcasted.

As mentioned above, the D2D relay configuration information is information which will control the behavior of the relay wireless device 303. The D2D relay configuration information is not relayed to the out of coverage wireless device 305.

The D2D relay configuration information may comprise at least one of the following:
- A criteria and algorithm of selection of relay: Which in coverage wireless device that should be selected to act as relay.
- The time for relaying the D2D control information to the out of coverage wireless device 305.
- What information that will be relayed as D2D control information to the out of coverage wireless device 305.
- How the relay wireless device 303 should relay D2D activity status information from the out of coverage wireless device 305 to the network node 301: e.g. should the relay wireless device 303 forward data immediately, or periodically.
- DRX information for the out of coverage wireless device 305 to listen/monitor for the D2D control information discontinuously.

Step 602b

This step is a substep of step 602 which describes an embodiment for configuring the relay wireless device 303 to be able to relay D2D control information, i.e. to behave as a relay. In some embodiments, the relay wireless device 303 sends a request to the network node 301 to act as a relay. In some embodiments, the request may be triggered by a discovery of a transmission/broadcast from an out of coverage wireless device 305.

In some embodiments, the relay wireless device 303 is configured to monitor transmissions from the out of coverage wireless device 305, and to report, to the network node 301. The report may be part of the configuration request.

Step 602c

In some embodiments, the network node 301 sends a response to the relay wireless device 303. The response comprises the D2D relay configuration information which enables the relay wireless device 303 to act as a relay, as requested in step 602b.

When there are several in coverage wireless devices which receive the D2D relay configuration information broadcasted from the network node 301, a selection of which wireless device that should be allowed to act as a relay, this takes place. This selection may be performed by the network node 101. On example of a criteria for selecting which wireless device of a plurality of wireless devices which are in coverage of the network node 301 that should act as a relay is to select a wireless device which performs broadcast transmission. In other words, a wireless device in coverage of the network node 301 which performs broadcast transmission will then also relay the D2D control information and/or synchronization signals. Initiating or setting up a broadcast transmission is then seen as an example of a trigger for a wireless device to start acting as a relay for D2D control information. The devices which do not meet selection criteria may send request to network node 301 to act as a relay for some reason, e.g. initiated by the user. If the network node 301 replies with D2D relay configuration information, the devices can start acting as a relay.

The out of coverage wireless device 305 monitors D2D communication. The monitoring may be continuously or following a pattern, which will be described in more detail later. This step is not necessarily started after step 603. The monitoring may start at any suitable time, for example after the out of coverage wireless device 305 has been synchronized with the relay wireless device 303 or after the out of coverage wireless device 305 has previously been configured to receive relayed information.

Step 603

The network node 301 determines the D2D control information that is to be relayed to the out of coverage wireless device 305.

At beginning, when there is no D2D activity status information available, network node 301 will set D2D control information according to some pre-configuration.

When there are some D2D activity status information received at step 606b available, the network node 301 adjusts previously determined and transmitted D2D control information according to the received D2D activity status information, e.g. increase resources for discovery/communication if the there is significant increasing in number of the out of coverage wireless devices whose buffer status is not zero.

Step 604a

The network node 301 broadcast the determined D2D control information. The D2D control information may be comprised in existing cellular broadcast information, i.e. MIB or SIB and may be periodically broadcasted.

The D2D control information may be received by all in coverage wireless devices, such as e.g. the relay wireless device 303 in FIG. 3. However, any other wireless devices not shown in FIG. 3 but which also are in coverage of the network node 301 may also receive the broadcast D2D control information.

In some embodiments, the D2D control information and the D2D relay configuration information is transmitted together in one message. Then, the relay wireless device 303 which receives the message separates the D2D control information and the D2D relay configuration information, keeps the D2D relay configuration information and relays the D2D control information to the out of coverage wireless device 305.

Step 604b

The relay wireless device 303 relays the D2D control information from step 604a to the out of coverage wireless device 305 using the D2D communication. This may also be described as forwarding of D2D control information. The content of the D2D control information is described in detail below.

In some embodiments, the relay wireless device 305 may perform other types of activities before relaying the D2D control information to the network node 301. Such activities may be for example re-encoding, re-modulating, changing format, selecting information etc.

Step 605

The out of coverage wireless device 305 receives the D2D control information from the relay wireless device 303 and applies the received information. The applying of the D2D control information may be for example adjusting its output power, synchronization with the relay wireless device 303 using previously received synchronization information etc.

Step 606a

In some embodiments, the out of coverage wireless device 305 transmits D2D activity status information to the relay wireless device 303 via the D2D communication. The D2D activity status information is intended for the network node 301.

Step 606b

In some embodiments, the relay wireless device 303 relays the D2D activity status information to the network node 301. In some embodiments, the relay wireless device 303 relays the D2D activity status information without performing any filtering or other processing of the D2D activity status information. In some embodiments, the relay wireless device 303 buffers the D2D activity status information in order to be able to transmit the information to the network node 301 periodically.

Some aspects described above with reference to FIG. 6 will now be described in more detail.

D2D Control Information

Figure 6:
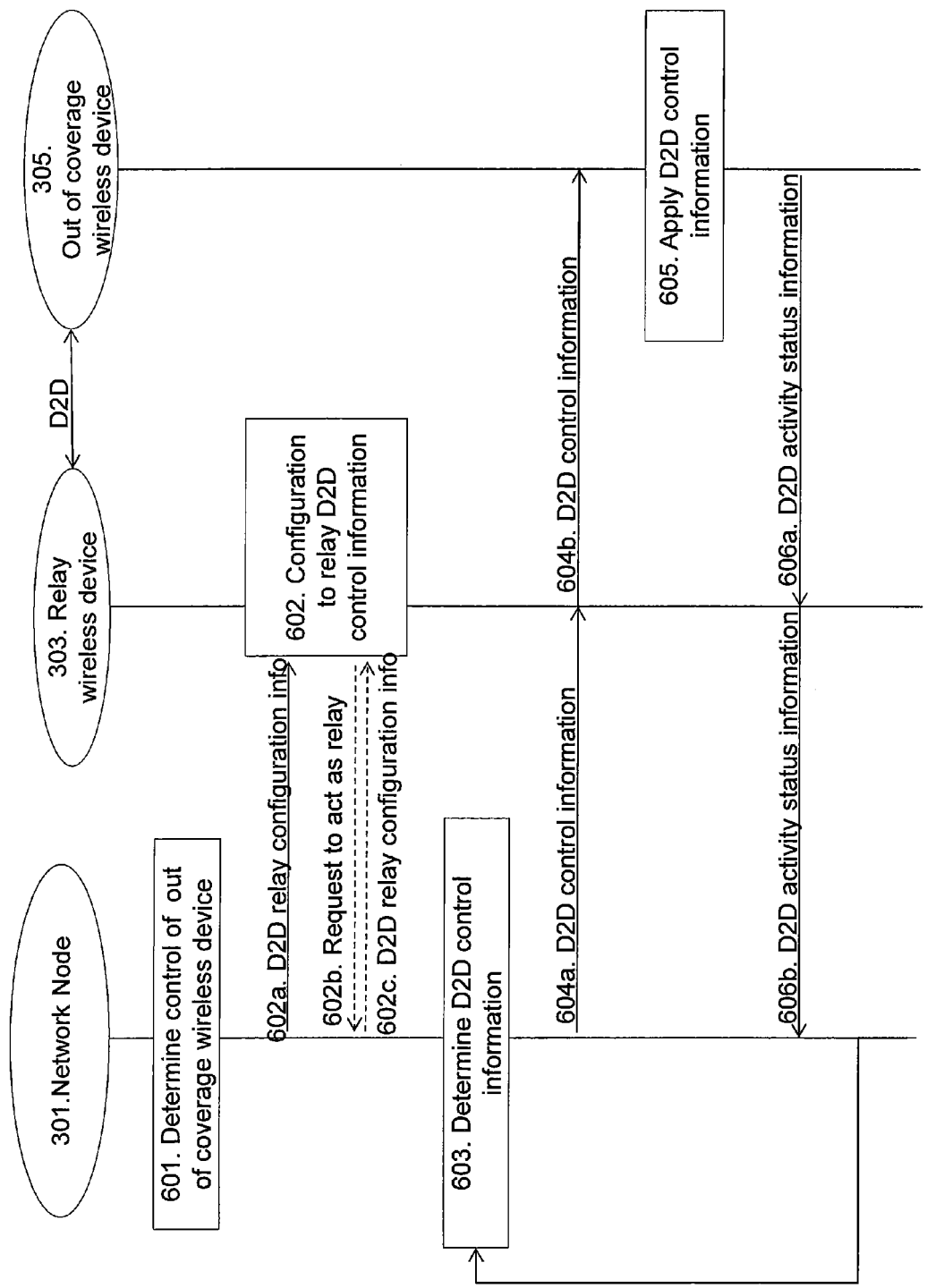
FIG. 6 is a signaling diagram illustrating embodiments of a method.

According to one embodiments, a relay wireless device 303 that is under network coverage relays the D2D control information received from the network node 301, targeting the out of coverage wireless device 305 (step 604b in FIG. 6).

The reception by the relay wireless device 303 in step 604a may be based on broadcast control information (e.g., MIB, SIB, BCH) or dedicated control information (conveyed by, e.g., DL data channels).

The transmission by the relay wireless device 303 in step 604b may be performed over resources previously or currently signaled by the network node 301, either with broadcast signaling (e.g., SIB, MIB, BCH).

The D2D control information may comprise parameters indicating at least some of the following elements:
power control setting for the D2D communication,
timing aspects,
synchronization information
   E.g., the ID of the synchronization reference and/or the type of synchronization source (eNB, Cluster Head, etc))
cell identity of cell 302,
resources for discovery/communication,
DRX information for the out of coverage wireless device 305 to listen/monitor for the relayed first control information discontinuously.

The out of coverage wireless device 305 should follow the parameters in the relayed D2D control information if/when received.

Synchronization

In some embodiments, the relay wireless device 303 transmits a periodic synchronization signal or information for example using pre-configured resources, possibly based on serving cell configurations of periodicity and time offset. The synchronization signal allows out of coverage neighbor wireless devices to synchronize to it. Such synchronization signal is based on the same synchronization of the serving cell associated to the relay wireless device 303, up to possibly propagation delay and relative frequency errors due to e.g. Doppler shift and oscillators inaccuracy. In other words, the synchronization of the cell 302 serving the relay wireless device 303 is relayed to the out of coverage wireless device 305.

Which information should be conveyed by the synchronization procedure?

One task of synchronization may be to enable the receivers to acquire a time and frequency reference. Such reference may be exploited for at least two goals:
1. Aligning the receiver window and frequency correction when detecting D2D channels;
2. Aligning the transmitter timing and parameters when transmitting D2D channels.

Regarding goal 1), synchronization procedures may be exploited to allow the D2D receiver to convey the following information:
Timing (and frequency) reference of the D2D resource pool for reception:
   Resources to be monitored for D2D communication scheduling assignments
   Resources to be monitored for D2D discovery
Identity of the synchronization source
   eNB cell ID
   Cluster Head identity Regarding goal 2), synchronization procedures may be exploited to allow a D2D transmitter to convey the following information:
Timing (and frequency) reference of the D2D pool resources for transmission:
   Resources to be used for transmitting D2D communication scheduling assignments.
   Resources to be used for transmitting D2D discovery beacons.

It may be clarified that the resources signaled for goal 2) may constitute a pool of contention based resources or contention-less resources. E.g., neither Type-1 nor Type-2 discovery are precluded by the above procedure.

Who should transmit synchronization signals?

Figure 7:
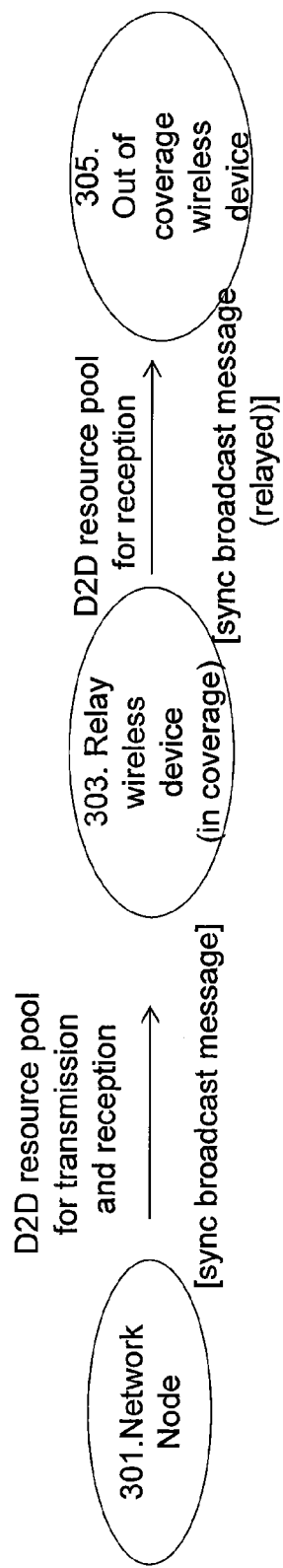
FIG. 7 is a schematic diagram illustrating embodiments of broadcast of synchronization signals.

Each D2D wireless device may need to be aware of the resources to be monitored for discovery and communication, both for the serving cell/cluster and for the neighbor cells/clusters/PLMNs. This may be necessary in order to simplify the receiver and allow aggressive DRX cycles, which are essential for acceptable power consumption levels. FIG. 7 illustrates an example embodiment where the network node 301, e.g. eNBs or Cluster Heads, broadcast the synchronization reference and D2D resource pool. The relay wireless device 303 camping on an eNB/Cluster Head relay the associated D2D resource pool. The serving network node 301 may broadcast the D2D pool resources for discovery and communication within its own cell/cluster, both for reception (goal 1)) and transmission (goal 2)).

However, the above information may not be sufficient for wireless device that are exposed to D2D channels transmitted by neighbor wireless devices camping on different cells, PLMNs and clusters. Therefore, wireless devices camping on such neighbor cells, PLMNs and clusters may need to periodically signal their own D2D resource pool along their synchronization reference, in order to allow efficient detection, as seen in FIG. 7. This purpose may be efficiently fulfilled by the synchronization protocol. In other words, ProSe enabled wireless devices may relay the synchronization reference and the D2D resource pool to be monitored (goal 1 above) by neighbor wireless devices.

Additionally, all wireless devices performing direct transmission may transmit synchronization signals in order to allow synchronization of all potential receivers.

Since multiple wireless devices within a cell/cluster 302 relay the same synchronization signals, the receiver might experience the superposition of multiple identical synchronization signals, up to some additional Doppler spread, time spread and gain diversity. Simulation results in the appendix show that such SFN superposition is actually beneficial for improved synchronization detection.

Figure 8:
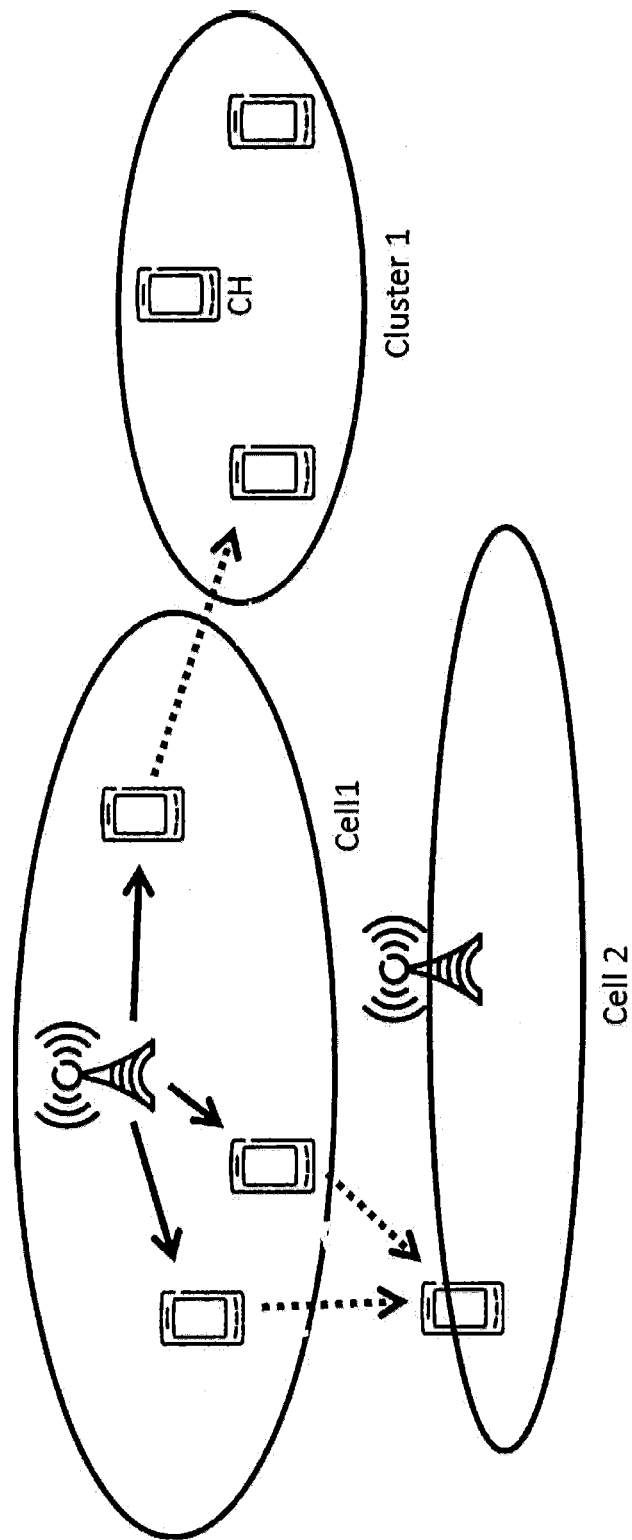
FIG. 8 is a schematic diagram illustrating embodiments of broadcast of synchronization signals.

FIG. 8 illustrates an example embodiment of synchronization signals broadcasted by eNBs (continuous lines), CHs (dot-dash) and wireless devices (dotted). Note that the lower-left wireless device receives synchronization signals as SFN combination of multiple identical sync signals relayed by wireless devices within cell 1.

Multiple Relay Wireless Devices

In some embodiments, multiple relay wireless devices 303 are configured by the serving cell 302, i.e. the network node 301. A special case is the one where all wireless devices act as relay wireless devices. All such relay wireless devices 303 are configured to broadcast the same D2D control information and/or the same synchronization signals as described above under the subjects D2D control information, such that the D2D control information is broadcasted in a System Frame Number (SFN) fashion. The SFN fashion means that multiple identical replicas of the same signal/message are transmitted over overlapping resources. A SFN will be periodically broadcast by the network node 301, e.g. an eNB.

As mentioned above, each of the multiple relay wireless devices 303 transmits exactly the same signal for control and/or synchronization, over the same time/frequency resources. Such multiple signals are combined incoherently at the receiving out of coverage wireless device 305, providing diversity gain and increases reliability. Such type of operation may transparent to the relay wireless device 303 and to the out of coverage wireless device 305.

Configuration of Relay Wireless Device

The relaying function of the relay wireless device 303 may be triggered in different ways (steps 602, 602a-c in FIG. 6):

A wireless device in coverage may request to its serving network node, e.g. network node 301, to act as a control plane relay (step 602b).

A cell may be configured (e.g. Operations, Administration, Maintenance (OaM)) for control plane relaying with selected wireless devices (a wireless device selection made in the network node 301 among enabled wireless devices, see below), and then the cell 302 configures these wireless for control plane relaying.

A cell may be configured (e.g. OaM) for control plane relaying with selected wireless devices (a wireless device selection made in the network node 301 among wireless devices, see below), and then the cell 302 configures these wireless devices for discovery detection initiated by of out of coverage wireless devices.

An in coverage wireless devices may use autonomous gaps for beacon discovery (listening on pre-configured resources, possibly with a wider scan to allow for frequency synch inaccuracies), and upon discovery of an out of coverage wireless device 305, it notifies the serving network node 301, which in turn may configure control plane relaying for this in coverage wireless device, and optionally other wireless devices with some selection, see below.

Only a subset of the wireless devices camping on a cell 302 may be selected to act as relay wireless device 303 for the control plane and/or synchronization. E.g., only wireless devices on the cell edge will relay the D2D control information. Cell edge wireless devices may be defined in different ways, some examples are wireless devices that fulfill certain criteria regarding cellular signal strength or Signal to Interference-plus-Noise Ratio (SINR) from the serving eNB (e.g. Reference Signal Received Power (RSRP) or Reference Signal Received Quality (RSRQ) below a given threshold). In another embodiment, the network node 301 may signal which wireless device should relay the D2D control information, where the selection is based, e.g. on uplink measurements (based on, e.g., Sounding Reference Signal (SRS)) and/or spatial measurements based on multiple antennas at the network node 301 when it is an eNB.

Periodically/Continuously

The relay wireless device 303 under network coverage may relay the D2D control information and optionally the D2D activity status information periodically. The out of coverage wireless device 305 may listen for the relayed D2D control information continuously. Once the out of coverage wireless device 305 has received the relayed D2D control information, the out of coverage wireless device 305 may synchronize with the network node 301 according to the timing and synchronization information in the relayed D2D control information and then listen in a DRX-like mode. Note that the out of coverage wireless device 305 may also listen continuously for the D2D control information to monitor other possible signals with a different yet unknown time reference.

Precedence

Precedence rules may be followed to handle the case of a conflict for example when multiple control plane information are received, associated to different cells and/or network nodes 301.

In some embodiments, control plane information relayed from a cell has precedence over control plane information relayed from a cluster head.

In some embodiments, between cell's control planes and between cluster head's control planes, the one with better signal quality is used. RSRP and RSRQ measurements may be used as signal quality indicators In another embodiment, if a wireless device under a cluster head receives relayed control plane information from a cell, it still uses the cluster head control plane.

D2D Activity Status Information

In some embodiments, a relay wireless device 303 that is under network coverage may also relay information from the out of coverage wireless device 305, targeting the network node 301 (steps 606a and 606b in FIG. 6). Such information may be referred to as D2D activity status information. The purpose of this is to enable the network node 301 to obtain the information about wireless device(s) which are under control by the network node 301. The D2D activity status information including information about wireless devices which are in coverage and the wireless devices which are out of coverage and are being able to receive relayed D2D control information. With this D2D activity status information, the network node 301 may decide e.g. how much resources it should allocated to D2D activities.

The relayed D2D activity status information may comprise at least some of the following parameters:
Out of coverage wireless device identifier.
Synchronization reference.
Out of coverage wireless device buffer status.
Out of coverage wireless device capability (discovery enabled only, communication enabled only or both enabled).

D2D Activity Status Information Pattern

The relay wireless device 303 under network coverage may relay the D2D activity status information from the out of coverage wireless device 305 to the network node 301 in some preconfigured pattern, e.g. real time, periodically, buffered data size threshold triggered, and etc. This preconfigured pattern may be preconfigured in the relay wireless device 303.

Real time: once the relay wireless device 303 receives the D2D activity status information from the out of coverage wireless device 305, the relay wireless device 303 may relay the D2D activity status information to the network node 301 immediately without any buffering.

Periodically: the relay wireless device 303 may buffer the D2D activity status information received from the out of coverage wireless device 305 and report this to the network node 301 with some preconfigured periodicity.

Buffered data size threshold triggered: the relay wireless device 30 may buffer the D2D activity status information received from the out of coverage wireless device 305. When and only when the size of buffered data reaches some preconfigured size, e.g. 1024 bytes, the relay wireless device 303 will report the D2D activity status information to the network node 301.

Trigger for D2D Activity Status Information

In some embodiments, only the out of coverage wireless device 305 which are able to receive the relayed D2D control information from the network node 301 may report the D2D activity status information to the network node 301.

The reporting of the D2D activity status information performed by the out of coverage wireless device 305 may be triggered in at least following events:
When the wireless device 305 is out of coverage and moving in a "relay-enabled" area, e.g. when the out of coverage wireless device 305 hears the relayed D2D control information from the network node 301 in step 604b.

Periodically, i.e. the out of coverage wireless device 305 reports the D2D activity status information periodically in some preconfigured periodicity, e.g. every one minute.

The buffer size threshold of the out of coverage wireless device 305 is triggered: when the data buffer of the out of coverage wireless device (to be transmitted using the D2D communication) reaches some preconfigured size, e.g. 16 KB, the out of coverage wireless device 305 should report the D2D activity status information to the network node 301.

The above triggers may be preconfigured in the out of coverage wireless device 305.

The embodiments herein are applicable to relaying D2D control information from a network node 301 such as an eNB or cluster head to out of coverage wireless device 305. The embodiments herein are also applicable relaying control information and/or synchronization from a network node 301 being a wireless device to another wireless device. The latter may be exploited, e.g., for multihop relaying of control information and/or synchronization information.

Figure 9:
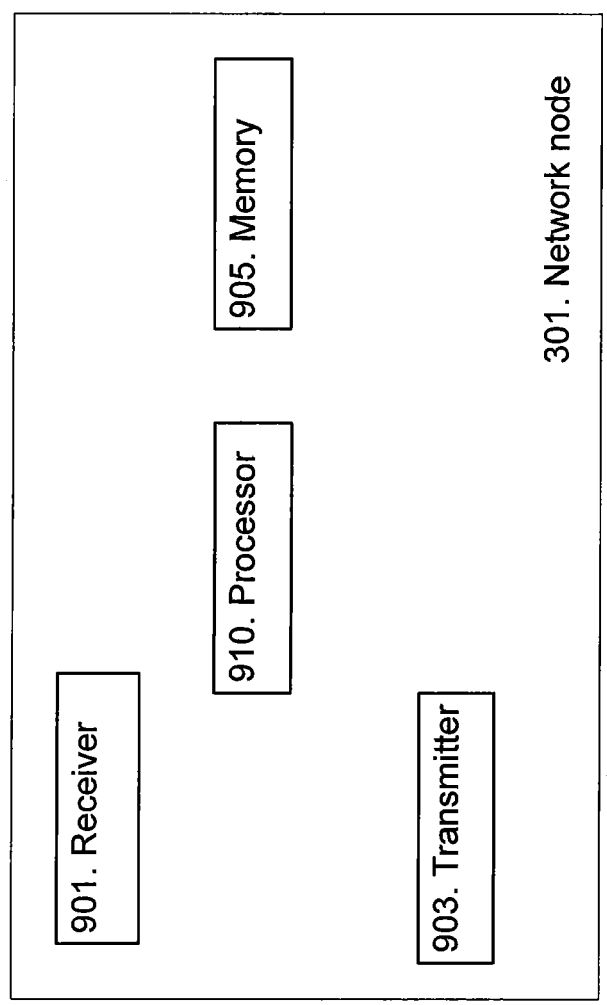
FIG. 9 is a schematic diagram illustrating embodiments of a network node.

To perform the method steps shown in FIG. 6 for handling relay of D2D control information using D2D communication, the network node 301 comprises an arrangement as shown in FIG. 9. The network node 301 comprises a receiver 901 adapted to receive e.g. D2D activity status information from the relay wireless device 303, to receive a configuration request from the relay wireless device 303, to receive data and information from other nodes in the communications system 300. The network node 301 further comprises a transmitter 903 which is adapted to transmit the D2D relay configuration info and D2D control information to the relay wireless device 303 and to transmit information and data to other nodes in the communications system 300.

The network node 301 may further comprise a memory 905 comprising one or more memory units. The memory 905 is arranged to be used to store data, received data streams, power level measurements, configuration information, synchronization information, D2D control information, D2D relay configuration information, D2D activity status information, threshold values, time periods, configurations, scheduling, and applications to perform the methods herein when being executed in the network node 301.

The network node 301 further comprises a processor 910 adapted to execute at least the steps of:
determining that the network node 301 should control the out of coverage wireless device 305; determining D2D control information to be used for controlling the out of coverage wireless device 305; and transmitting the D2D control information to the out of coverage wireless device 305 via a relay wireless device 303.

The processor 910 may further be adapted to execute the steps of:
receiving D2D activity status information from the out of coverage wireless device 305 relayed via the relay wireless device 303; and where the determining D2D control information is to be used for controlling the out of coverage wireless device 305; to further execute the step of:
determining the D2D control information in accordance with the received D2D activity status information, and where further the D2D control information may be transmitted together with the D2D relay configuration information, and where the D2D relay configuration information may indicate which resources the relay wireless device 303 should use when relaying the D2D control information to the out of coverage wireless device 305.

The processor 910 may further be adapted to execute step of:

providing D2D relay configuration information to the relay wireless device 303, which D2D relay configuration information enables the relay wireless device 303 to be configured to relay D2D control information to the out of coverage wireless device 305 using the D2D communication and to relay D2D activity status information from the out of coverage wireless device 305 using the D2D communication.

Figure 10:
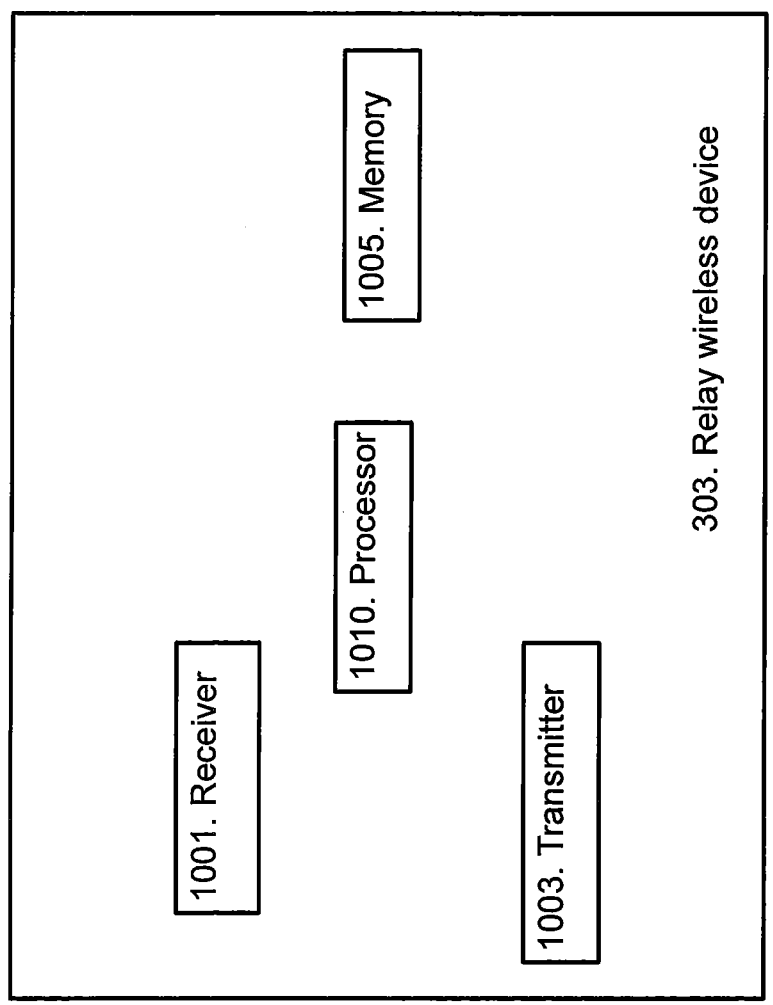
FIG. 10 is a schematic diagram illustrating embodiments of a relay wireless device.

To perform the method steps shown in FIG. 6 for enabling control of an out of coverage wireless device 305 using D2D, communication the relay wireless device 303 comprises an arrangement as shown in FIG. 10. The relay wireless device 303 comprises a receiver 1001 adapted to receive e.g. D2D relay configuration information from the network node 301, to receive D2D control information broadcasted by the network node 301, to receive data and information from other nodes in the communications system 300. The relay wireless device 303 further comprises a transmitter 1003 which is adapted to transmit, i.e. to transmit Configuration request to the network node 301, to relay the D2D control information to the out of coverage wireless device 305, to transmit the D2D activity status information to the network node 301, and to transmit information and data to other nodes in the communications system 300.

The relay wireless device 303 may further comprise a memory 1005 comprising one or more memory units. The memory 1005 is arranged to be used to store data, received data streams, power level measurements, configuration information, synchronization information, D2D control information, D2D relay configuration information, D2D activity status information, threshold values, time periods, configurations, scheduling, and applications to perform the methods herein when being executed in the relay wireless device 303.

The relay wireless device 303 further comprises a processor 1010 adapted to execute at least the steps of:

receiving the D2D control information from the network node 301; and relaying the D2D control information to the out of coverage wireless device 305 using D2D communication.

The processor 1010 may further be adapted to execute the steps:

transmitting synchronization information to the out of coverage wireless device 305, which synchronization information enables the relay wireless device 303 and the out of coverage wireless device 305 to be synchronized in exchanging information.

The processor 1010 may further be adapted to execute the steps:

configuring the relay wireless device 303 to support relay of the D2D control information to the out of coverage wireless device 305 and to support relay of D2D activity status information from the out of coverage wireless device 305.

The processor 1010 may further be adapted to execute the steps:

receiving D2D relay configuration information from the network node 301; and wherein the configuring the relay wireless device 303 is based on the received D2D relay configuration information.

The processor 1010 may further be adapted to execute the steps:

transmitting a request for D2D relay configuration information to the network node 301; and wherein the received D2D relay configuration information is received in response to the transmitted request.

The processor 1010 may further be adapted to execute the steps:

receiving D2D activity status information from the out of coverage wireless device 305; and relaying the D2D activity status information to the network node 301, which D2D activity status information provides information to the network node 301 indicating how the network node 301 should control the out of coverage wireless device 305.

Figure 11:
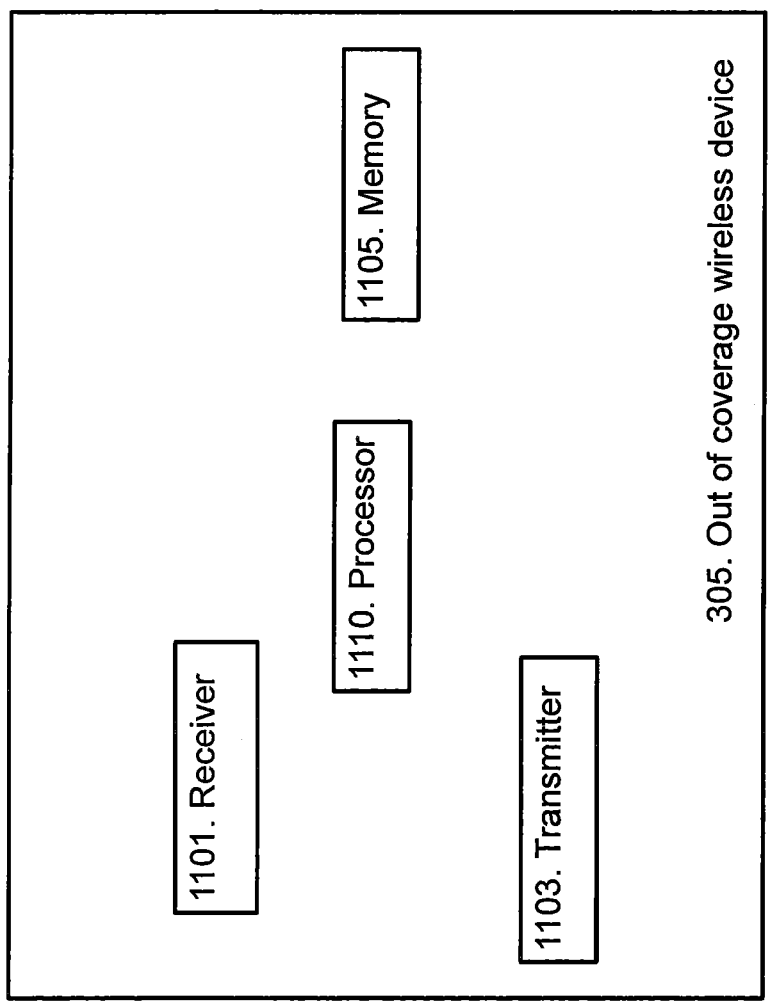
FIG. 11 is a schematic diagram illustrating embodiments of an out of coverage wireless device.

To perform the method steps shown in FIG. 6 for enabling control of an out of coverage wireless device 305 using D2D, communication the out of coverage wireless device 305 comprises an arrangement as shown in FIG. 11. The out of coverage wireless device 305 comprises a receiver 1101 receive e.g. D2D control information from the relay wireless device 303 and other data and information from other nodes and wireless devices in the communications system 300.

In some embodiments, the out of coverage wireless device 305 comprises a transmitter 1103. The transmitter 1103 may be adapted to transmit e.g. the D2D activity status information to the relay wireless device 303. However, not all out of coverage wireless device 305 does not need to transmit D2D activity status, and it is therefore not necessary for all the out of coverage wireless device 305 to comprise the transmitter 903. In such case, the out of coverage wireless device 305 only listens to D2D control information, but does not transmit the D2D activity status.

The out of coverage wireless device 305 may further comprise a memory 1105 comprising one or more memory units. The memory 1105 is arranged to be used to store data, received data streams, power level measurements, configuration information, synchronization information, D2D control information, D2D activity status information, threshold values, time periods, configurations, scheduling, and applications to perform the methods herein when being executed in the out of coverage wireless device 305.

The out of coverage wireless device 305 further comprise a processor 1110 adapted to execute at least the steps of:

receiving the D2D control information from the network node 301 and relayed through a relay wireless device 303; and applying the received D2D control information so that the out of coverage wireless device 305 is controlled by the network node 301.

The processor 1110 may further be adapted to execute the steps:

receiving synchronization information from the relay wireless device 303, which synchronization information enables the out of coverage wireless device 305 and the relay wireless device 303 to be synchronized in exchanging information, The processor 1110 may further be adapted to execute the steps:

continuously monitoring relayed D2D control information from the relay wireless device (305) on the D2D link.

The processor 1110 may further be adapted to execute the steps:

transmitting D2D activity status information to the relay wireless device 303 for further relaying to the network node 301, wherein the D2D activity status information provides information to the network node 301 indicating which out of coverage wireless devices that are in control of the network node 301 and indicating how the network node 301 should control the out of coverage wireless device 305.

The present mechanism for handling relay of D2D control information using D2D communication, may be implemented through one or more processors, such as a processor 910 in the network node 301 depicted in FIG. 9, a processor 1010 in the relay wireless device 303 depicted in FIG. 10 and a processor 1110 in the out of coverage wireless device 305 depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the network node 301 and/or relay wireless device 303 and/or out of coverage wireless device 305. One such carrier may be in the form of a CD ROM disc. It is however feasible with other data carriers such as a memory stick. The computer program code can furthermore be provided as pure program code on a server and downloaded to the network node 301 and/or relay wireless device 303 and/or out of coverage wireless device 305.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to" or "adapted to".

It should also be emphasized that the steps of the methods defined herein may, without departing from the embodiments herein, be performed in another order than the order in which they appear.

The invention claimed is:

1. A method in a network node for handling relay of Device to Device, D2D, control information using D2D communication,
   wherein the network node serves a cell in which a relay wireless user equipment device is at least partially located,
   wherein the network node provides at least partial network coverage for the relay wireless user equipment device in the cell,
   wherein an out of coverage wireless user equipment device is at least partially out of network coverage from the network node,
   the method comprising:
      determining that the network node should control the out of coverage wireless user equipment device;
      receiving D2D activity status information at the network node from the out of coverage wireless user equipment device relayed via the relay wireless user equipment device so that the D2D activity status information is received as a D2D communication at the relay wireless user equipment device from the out of coverage wireless user equipment device and as a cellular network communication at the network node from the relay wireless user equipment device;
      responsive to receiving the D2D activity status information from the out of coverage wireless user equipment device relayed via the relay wireless user equipment device, determining at the network node D2D control information to be used for controlling the out of coverage wireless user equipment device, wherein the D2D control information is determined in accordance with the received D2D activity status information relayed via the relay wireless user equipment device, wherein the D2D control information comprises information to be applied by the out of coverage wireless user equipment device to adapt the out of coverage wireless user equipment device to at least one of: mitigate interference by the out of coverage wireless user equipment device and adjust a power level used by the out of coverage wireless user equipment device; and
      transmitting the D2D control information from the network node to the out of coverage wireless user equipment device via the relay wireless user equipment device so that the D2D control information is transmitted as a cellular network communication from the network node to the relay wireless user equipment device and as a D2D communication from the relay wireless user equipment device to the out of coverage wireless user equipment device using resources specified by the network node to use when relaying the D2D control information.

2. The method according to claim 1, wherein D2D control information is transmitted together with D2D relay configuration information from the network node to the relay wireless user equipment device, and wherein the D2D relay configuration information indicates the resources specified by the network node that the relay wireless user equipment device should use when relaying the D2D control information to the out of coverage wireless user equipment device.

3. The method according to claim 1, wherein the D2D control information that is transmitted to the out of coverage wireless user equipment device via the relay wireless user equipment device is at least one of:
   power control setting for a D2D link between the out of coverage wireless user equipment device and the relay wireless user equipment device;
   timing aspects;
   synchronization information, including an identity of a synchronization reference and/or a type of synchronization source;
   cell identity of a cell served by the network node;
   communications resources for discovery/communication between the network node and the relay wireless user equipment device; and
   DRX information for the out of coverage wireless user equipment device to listen for the D2D control information discontinuously.

4. The method according to claim 1, further comprising:
   providing D2D relay configuration information to the relay wireless user equipment device, which D2D relay configuration information enables the relay wireless user equipment device to be configured to relay D2D control information to the out of coverage wireless user equipment device using the D2D communication and to relay D2D activity status information from the out of coverage wireless user equipment device using the D2D communication.

5. The method according to claim 1, wherein the out of coverage wireless user equipment device and the relay wireless user equipment device are both Proximity Service, ProSe, enabled wireless user equipment devices.

6. The method according to claim 1, wherein the network node is one of a base station, a Cluster Head, CH, and a wireless user equipment device.

7. A method in a relay wireless user equipment device for handling relay of Device to Device, D2D, control information using D2D communication,
    wherein the relay wireless user equipment device is located in a cell served by a network node,
    wherein the relay wireless user equipment device is at least partially provided with network coverage by the network node, and
    wherein an out of coverage wireless user equipment device is at least partially out of network coverage from the network node,
    the method comprising:
        receiving the D2D control information at the relay wireless user equipment device from the network node so that the D2D control information is received as a cellular network communication from the network node at the relay wireless user equipment device, wherein the D2D control information comprises information to be applied by the out of coverage wireless user equipment device to adapt the out of coverage wireless user equipment device to at least one of: mitigate interference by the out of coverage wireless user equipment device and adjust a power level used by the out of coverage wireless user equipment device;
        relaying the D2D control information to the out of coverage wireless user equipment device using D2D communication so that the D2D control information is received as the cellular network communication from the network node and transmitted as a D2D communication from the relay wireless user equipment device to the out of coverage wireless user equipment device using resources specified by the network node to use when relaying the D2D control information;
        receiving D2D activity status information at the relay wireless user equipment device from the out of coverage wireless user equipment device so that the D2D activity status information is received as a D2D communication at the relay wireless user equipment device from the out of coverage wireless user equipment device; and
        relaying the D2D activity status information to the network node so that the D2D activity status information is received as the D2D communication from the out of coverage wireless user equipment device and transmitted as a cellular network communication from the relay wireless user equipment device to the network node, wherein the D2D activity status information provides information to the network node indicating how the network node should control the out of coverage wireless user equipment device.

8. The method according to claim 7, further comprising:
    transmitting synchronization information to the out of coverage wireless user equipment device, which synchronization information enables the relay wireless user equipment device and the out of coverage wireless user equipment device to be synchronized in exchanging information.

9. The method according to claim 7, further comprising:
    configuring the relay wireless user equipment device to support relay of the D2D control information to the out of coverage wireless user equipment device and to support relay of D2D activity status information from the out of coverage wireless user equipment device.

10. The method according to claim 9, further comprising:
    receiving D2D relay configuration information from the network node; and
    wherein the configuring the relay wireless user equipment device is based on the received D2D relay configuration information.

11. The method according to claim 10, further comprising:
    transmitting a request for D2D relay configuration information to the network node; and
    wherein the received D2D relay configuration information is received in response to the transmitted request.

12. The method according to claim 7, wherein the D2D control information is periodically relayed to the out of coverage wireless user equipment device using D2D communication.

13. The method according to claim 7, wherein the D2D activity status information is relayed to the network node according to a transmission pattern.

14. The method according to claim 7, further comprising:
    configuring the relay wireless user equipment device to support relay of D2D activity status information from the out of coverage wireless user equipment device.

15. The method according to claim 7, wherein the relay wireless user equipment device and the out of coverage wireless user equipment device are both Proximity Service, ProSe, enabled wireless user equipment devices.

16. The method according to claim 10, wherein the relay configuration information comprises at least one of:
    a criteria and algorithm of selection of relay: wherein the criteria and algorithm are devised to select which in coverage wireless user equipment device that should be selected to act as relay wireless user equipment device;
    a time for relaying the D2D control information to the out of coverage wireless user equipment device;
    information that will be relayed as D2D control information to the out of coverage wireless user equipment device;
    information on how the relay wireless user equipment device should relay D2D activity status information from the out of coverage wireless user equipment device to the network node; and
    DRX information for the out of coverage wireless user equipment device to listen/monitor the D2D control information discontinuously.

17. A method in an out of coverage wireless user equipment device for handling relay of Device to Device, D2D, control information using D2D communication,
    wherein the out of coverage wireless user equipment device is at least partially out of network coverage from a network node serving a cell,
    wherein the out of coverage wireless user equipment device is adapted to communicate with a relay wireless user equipment device,
    wherein the relay wireless user equipment device is located in a cell served by the network node,
    wherein the relay wireless user equipment device is at least partially provided with network coverage by the network node,
    the method comprising:
        receiving the D2D control information at the out of coverage wireless user equipment device from the network node and relayed through the relay wireless user equipment device so that the D2D control information is received as a cellular network communication from the network node at the relay wireless user equipment device and as a D2D communication from the relay wireless user equipment device at the out of coverage wireless user equipment device, wherein the D2D control information comprises information to be applied by the out of coverage wireless user equipment device to adapt the out of coverage wireless user equipment device to at least one of: mitigate interference by the out of coverage wireless user equipment device and adjust a power level used by the out of coverage wireless user equipment device;

applying the received D2D control information so that the out of coverage wireless user equipment device is controlled by the network node; and transmitting D2D activity status information from the out of coverage wireless user equipment device to the relay wireless user equipment device for further relaying to the network node so that the D2D activity status information is transmitted as a D2D communication from the out of coverage wireless user equipment device to the relay wireless user equipment device and as a cellular network communication from the relay wireless user equipment device to the network node, wherein the D2D activity status information provides information to the network node indicating which out of coverage wireless user equipment devices that are in control of the network node and indicating how the network node should control the out of coverage wireless user equipment device.

18. The method according to claim 17, further comprising:

receiving synchronization information from the relay wireless user equipment device, which synchronization information enables the out of coverage wireless user equipment device and the relay wireless user equipment device to be synchronized in exchanging information.

19. The method according to claim 17, further comprising:

continuously monitoring relayed D2D control information from the relay wireless user equipment device on a D2D link between the out of coverage wireless user equipment devices and the relay wireless user equipment device.

20. The method according to claim 17, wherein the D2D activity status information comprises at least one of:

out of coverage wireless user equipment device identifier;
synchronization reference;
out of coverage wireless user equipment device buffer status; and
out of coverage wireless user equipment device capability.

21. A network node for handling relay of Device to Device, D2D, control information using D2D communication, wherein the network node comprises:
a processor; and
a memory coupled to the processor and comprising a computer readable program code embodied in the memory that when executed by the processor causes the network node to perform operations comprising:
determining that the network node should control an out of coverage wireless user equipment device;

receiving D2D activity status information at the processor of the network node from the out of coverage wireless user equipment device relayed via the relay wireless user equipment device so that the D2D activity status information is received as a D2D communication at the relay wireless user equipment device from the out of coverage wireless user equipment device and as a cellular network communication at the network node from the relay wireless user equipment device;

responsive to receiving the D2D activity status information from the out of coverage wireless user equipment device relayed via the relay wireless user equipment device, determining by the processor of the network node D2D control information to be used for controlling the out of coverage wireless user equipment device, wherein the D2D control information is determined in accordance with the received D2D activity status information relayed via the relay wireless user equipment device, and wherein the D2D control information comprises information to be applied by the out of coverage wireless user equipment device to adapt the out of coverage wireless user equipment device to at least one of: mitigate interference by the out of coverage wireless user equipment device and adjust a power level used by the out of coverage wireless user equipment device; and transmitting by the processor of the network node the D2D control information to the out of coverage wireless user equipment device via a relay wireless user equipment device so that the D2D control information is transmitted as a cellular network communication from the network node to the relay wireless user equipment device and as a D2D communication from the relay wireless user equipment device to the out of coverage wireless user equipment device using resources specified by the network node to use when relaying the D2D control information.

22. The network node according to claim 21, wherein the operations further comprise:

providing D2D relay configuration information to the relay wireless user equipment device, which D2D relay configuration information enables the relay wireless user equipment device to be configured to relay D2D control information to the out of coverage wireless user equipment device using the D2D communication and to relay D2D activity status information from the out of coverage wireless user equipment device using the D2D communication.

23. The network node according to claim 21, wherein the out of coverage wireless user equipment device and the relay wireless user equipment device are both Proximity Service, ProSe, enabled wireless user equipment devices.

24. A relay wireless user equipment device for handling relay of Device to Device, D2D, control information using D2D communication, wherein the relay wireless user equipment device comprises:
a processor; and
a memory coupled to the processor and comprising a computer readable program code embodied in the memory that when executed by the processor causes the relay wireless user equipment device to perform operations comprising:

receiving the D2D control information at the processor of the relay wireless user equipment device from a network node so that the D2D control information is received as a cellular network communication from the network node at the relay wireless user equipment device, wherein the D2D control information comprises information to be applied by the out of coverage wireless user equipment device to adapt the out of coverage wireless user equipment device to at least one of: mitigate interference by the out of coverage wireless user equipment device and adjust a power level used by the out of coverage wireless user equipment device;

relaying the D2D control information to an out of coverage wireless user equipment device using D2D communication so that the D2D control information is received as a cellular network communication from the network node and transmitted as a D2D communication from the relay wireless user equipment device to the out of coverage wireless user equipment device using resources specified by the network node to use when relaying the D2D control information;

receiving D2D activity status information at the processor of the relay wireless user equipment device from the out of coverage wireless user equipment device so that the D2D activity status information is received as a D2D communication at the relay wireless user equipment device from the out of coverage wireless user equipment device; and relaying the D2D activity status information to the network node so that the D2D control information is received as the D2D communication from the out of coverage wireless user equipment device and transmitted as a cellular network communication from the relay wireless user equipment device to the network node, wherein the D2D activity status information provides information to the network node indicating how the network node should control the out of coverage wireless user equipment device.

25. The relay wireless user equipment device according to claim 24 wherein the operations further comprise:
configuring the relay wireless user equipment device to support relay of the D2D control information to the out of coverage wireless user equipment device and to support relay of D2D activity status information from the out of coverage wireless user equipment device.

26. The relay wireless user equipment device according to claim 25 wherein the operations further comprise:
receiving D2D relay configuration information from the network node; and
wherein the configuring the relay wireless user equipment device is based on the received D2D relay configuration information.

27. The relay wireless user equipment device according to claim 26 wherein the operations further comprise:
transmitting a request for D2D relay configuration information to the network node; and
wherein the received D2D relay configuration information is received in response to the transmitted request.

28. An out of coverage wireless user equipment device for handling relay of Device to Device, D2D, control information using D2D communication, wherein the out of coverage wireless user equipment device comprises:
a processor; and
a memory coupled to the processor and comprising a computer readable program code embodied in the memory that when executed by the processor causes the out of coverage wireless user equipment device to perform operations comprising:
receiving the D2D control information at the processor of the out of coverage wireless user equipment device from a network node and relayed through a relay wireless user equipment device so that the D2D control information is received as a cellular network communication from the network node at the relay wireless user equipment device and received as a D2D communication from the relay wireless user equipment device at the out of coverage wireless user equipment device, wherein the D2D control information comprises information to be applied by the out of coverage wireless user equipment device to adapt the out of coverage wireless user equipment device to at least one of: mitigate interference by the out of coverage wireless user equipment device and adjust a power level used by the out of coverage wireless user equipment device;
applying the received D2D control information so that the out of coverage wireless user equipment device is controlled by the network node; and
transmitting D2D activity status information from the processor of the out of coverage wireless user equipment device to the relay wireless user equipment device for further relaying to the network node so that the D2D activity status information is transmitted as a D2D communication to the relay wireless user equipment device from the out of coverage wireless user equipment device and as a cellular network communication to the network node from the relay wireless user equipment device, wherein the D2D activity status information provides information to the network node indicating which out of coverage wireless user equipment devices that are in control of the network node and indicating how the network node should control the out of coverage wireless user equipment device.

29. The out of coverage wireless user equipment device according to claim 28, wherein the operations further comprise:
receiving synchronization information from the relay wireless user equipment device, which synchronization information enables the out of coverage wireless user equipment device and the relay wireless user equipment device to be synchronized in exchanging information.

30. The out of coverage wireless user equipment device according to claim 28, wherein the operations further comprise:
continuously monitoring relayed D2D control information from the relay wireless user equipment device on a D2D link between the out of coverage wireless user equipment device and the relay wireless user equipment device.

* * * * *